United States Patent [19]
Schier

[11] Patent Number: 5,650,179
[45] Date of Patent: Jul. 22, 1997

[54] APPARATUS FOR PELLETIZING POLYMERS

[75] Inventor: Helge Schier, Schwechat, Austria

[73] Assignee: PCD Polymere Gesellschaft m.b.H., Linz, Austria

[21] Appl. No.: 517,794

[22] Filed: Aug. 22, 1995

[30] Foreign Application Priority Data

| Aug. 23, 1994 | [AT] | Austria | 1627/94 |
| Nov. 18, 1994 | [AT] | Austria | 2136/94 |

[51] Int. Cl.$^6$ ............................................. B29B 9/06
[52] U.S. Cl. .................. 425/146; 264/40.7; 264/142; 425/311; 425/313; 425/379.1; 425/382 R; 425/382.3; 425/382.4; 425/464
[58] Field of Search ..................... 264/141–143, 264/118, 40.7; 425/67, 311, 313, 146, 182, 183, 463, 464, 382 R, 379.1, 382.3, 382.4

[56] References Cited

U.S. PATENT DOCUMENTS

| 3,464,086 | 9/1969 | Hasten et al. |
| 3,600,745 | 8/1971 | Hench et al. |
| 3,874,835 | 4/1975 | Rossiter et al. |
| 4,038,002 | 7/1977 | Inaba et al. ........................ 425/146 |
| 4,167,384 | 9/1979 | Shirato et al. ..................... 425/376.1 |
| 4,822,546 | 4/1989 | Lohkamp ............................ 425/67 |
| 4,890,996 | 1/1990 | Shimizu ............................ 264/40.7 |
| 5,094,606 | 3/1992 | Lambertus ......................... 264/142 |
| 5,158,730 | 10/1992 | Pawelczyk et al. .................. 264/142 |

FOREIGN PATENT DOCUMENTS

| 1 937 862 | 7/1969 | Germany. |
| 2 215 841 | 3/1972 | Germany. |
| 54-73850 | 6/1979 | Japan ............................. 264/141 |
| 6-143255 | 5/1994 | Japan ............................. 264/143 |
| 376 923 | 8/1970 | U.S.S.R. |
| 1 353 640 | 11/1987 | U.S.S.R. |
| 2040217 | 8/1980 | United Kingdom ................... 264/142 |

OTHER PUBLICATIONS

Derwent Abstracts: DERC88–166986.

Derwent Abstracts: DERC72–10433S.

*Primary Examiner*—Jeffery R. Thurlow
*Attorney, Agent, or Firm*—Wenderoth, Lind & Ponack

[57] ABSTRACT

An apparatus for pelletizing a polymer melt, in which the polymer melt to be pelletized is divided in a housing of a pelletizing device into at least two part-streams, which are deflected and fed to at least two die plates which are spatially separate from one another and are heatable, whereupon the polymer melt streams are transformed into pellets by the cutting devices downstream of the die plates and are post-treated by means of a cooling medium. The apparatus for this has a housing (4) of a granulating device, which housing is connected to the outlet end of an extrusion device (11), with a starting valve which is arranged in the housing and is designed with a cock (1) which can be changed in its position in the housing, the cock (1) having in the operating position an inlet opening (18), connected to the extrusion device, and laterally of said opening, outlets (5) connected thereto, to which outlets there are respectively connected in the housing manifold spaces (2) which are virtually free from dead spots and connect the cock to at least two heatable die plates (3).

4 Claims, 1 Drawing Sheet

APPARATUS FOR PELLETIZING POLYMERS

In the process of producing plastics, the compounding phase is normally concluded by a pelletizing operation, in which the polymer melt is transformed in a suitable pelletizing apparatus into a state in which it can be stored, transported and processed well, that is in the form of pellets. Different pelletizing methods are used for this, depending on the desired throughput. For high throughputs, underwater pelletizing has so far been the most suitable.

In this process, as known for example from DE 38 15 897 C1, the polymer melt to be pelletized is forced via a starting valve and, if appropriate, via a screen changer to the die plate and the pellets produced by the cutting device downstream of the die plate are fed by means of a cooling water stream to a drying device, an exact cut at the die plate being crucial for the quality of the pellets. A prerequisite for an exact cut is a cutting surface of the die plate which is as planar as possible.

With the previously used pelletizing apparatuses, however, problems occur, since the large die plates necessary for high throughputs of several tons/hour, having a diameter of more than 450 mm, are constantly deformed by the temperature differences prevailing on the outer surfaces of the die plates. The extent of the deformation in this case depends on the rigidity and the diameter of the die plate, and also on the prevailing temperature difference and the pressure exerted by the polymer melt. The larger the die plates are, the greater the deformation, as a result of which an exact cut is no longer possible in the pelletizing. The deformability of the die plates has particularly disadvantageous effects in the cutting or pelletizing of polymers having a high melt flow index, in particular in the case of polypropylene having a melt flow index of greater than 50 (g/10 min, 230° C., load 2.16 kg). The invention was therefore based on the object of decisively improving the cut quality of the pellets, in particular in the pelletizing of polymer melts having a high melt flow index.

Unexpectedly, it has been possible to find a process and an apparatus by which polymers, in particular polymers having a high melt flow index, such as for instance polypropylene with a melt flow index of greater than 50 (g/10 min, 230° C., load 2.16 kg), can be pelletized unproblematically, the disadvantages of the previously used die plates being avoided and a high throughput of polymer melt being permitted.

The subject of the present invention is accordingly a process for pelletizing a polymer melt, wherein the polymer melt to be pelletized is divided in the housing of a pelletizing device into at least two part-streams, which are respectively deflected and fed to at least two die plates which are spatially separate from one another and are heatable, whereupon the part-streams are transformed into pellet form by the cutting devices assigned to the die plates and are post-treated by means of a cooling medium.

A further subject of the present invention is an apparatus for carrying out the process according to the invention, wherein a starting valve (13) is arranged in a housing (4) of a pelletizing device, which housing is connected to the outlet end of an extrusion device, and the starting valve (13) is designed with a cock (1) which can be changed in its position in the housing (4), the cock (1) having in the operating position an inlet opening (18), connected to the extrusion device (11), and laterally of said opening, at least two outlets (5) connected thereto, to which outlets there are respectively connected in the housing manifold spaces (2) which are virtually free from dead spots and connect the cock (1) to at least two die plates (3) which are heatable and spatially separate from one another.

BRIEF DESCRIPTION OF THE DRAWINGS

An exemplary embodiment of the invention is represented in more detail in FIGS. 1 to 5 and is described below.

As the exemplary embodiment shows, a polymer melt compounded by an upstream extruder 11 is divided into two part-streams. The division takes place in a cock 1 of a pelletizing device 14, in which starting valve 13 and pelletizing housing 4 are of one piece and thus form a unit. As shown in FIGS. 1 and 2, the pelletizing device 14 is firmly connected to an extrusion device, for instance an extruder 11, by means of a flange 15. The outlet opening of the extruder 11 is connected to the cock 1 by a bore 16 arranged in the housing 4. This cock 1 is displaceable in the housing 4 and is moved by a piston/cylinder unit 6. The cock 1 has for starting operation an inlet 19 and a secondary outlet 7, from which, in the corresponding position, the polymer melt is channeled out of the housing 4. In the operating position, the polymer melt to be pelletized passes through the outlet opening of the extruder through the inlet opening 18, into the cock 1, whereupon the division of the melt stream takes place in the cock 1, and the part-streams pass through the laterally arranged outlets 5 and 5' into the manifold spaces 2 and 2'. The outlets 5 and 5' at the sides of the cock 1 are in this case positioned such that there takes place both a division of the polymer stream and a deflection of the part-streams. It is preferred for the part-streams to be deflected by in each case 45 to 120°. Particularly preferred is a deflection by in each case 90°, as shown in FIG. 3. The outlets 5 and 5' are in this case two simple identically dimensioned bores. The manifold spaces 2 and 2' connect the cock 1 to two identical die plates 3 and 3', respectively, at which conical displacers 17 and 17' are respectively arranged for the purpose of uniform distribution of the melt. The manifold spaces are in this case dimensioned such that they ensure melt flow paths which are as short as possible. According to the type of design of the pelletizing device, instead of being equipped with a cock 1, the apparatus according to the invention may also be equipped with a fixedly installed component of corresponding geometry. The die plate diameter D (FIG. 3), the number of dies and the die diameter d depend on the desired throughput and on the output of the upstream extruder 11 used, and also on the desired pellet size and the polymers to be pelletized.

The diameter of the die plates 3 and 3' may thus vary and can be adapted to the respective intended use. For example, die plates having a diameter of up to 450 mm, preferably up to 360 mm, are suitable for the pelletizing of polymers having a melt flow index of over 50 (g/10 min, 230° C., load 2.16 kg).

If polymers having a lower melt flow index are pelletized, die plates of a relatively large diameter may however also be used.

Figure 1:
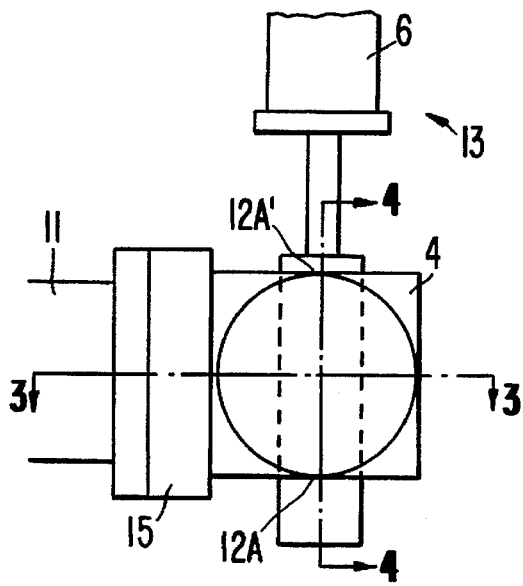
In FIG. 1, a possible embodiment of the apparatus according to the invention is shown in side view.
Figure 4:
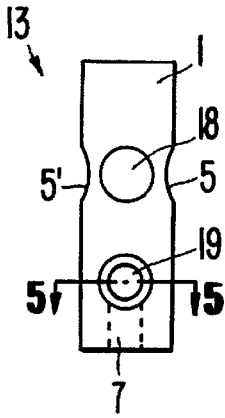
FIG. 4 shows in detail the cock along the line of intersection BB according to FIG. 1, with the inlet openings for operating position (18) and starting position (19).
Figure 2:
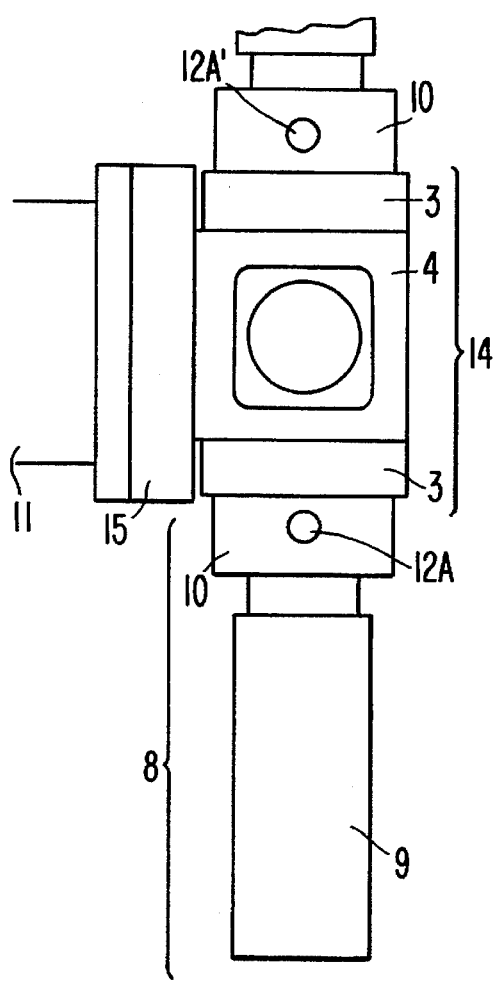
In FIG. 2, the apparatus according to FIG. 1 is shown in a plan view; the inlet and outlet openings for the cooling medium 12A and 12A' are shown.
Figure 3:
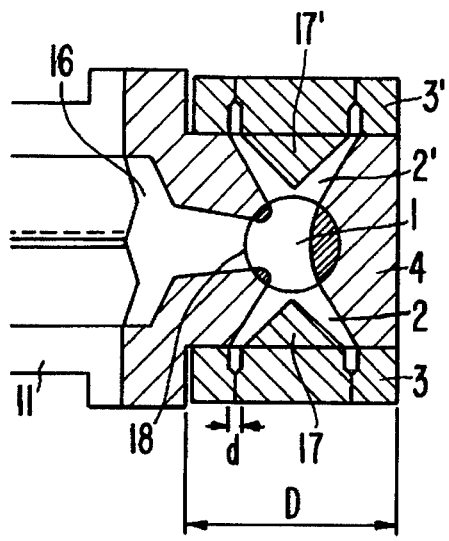
FIG. 3 represents the starting valve with cock (1) and die plates (3,3') in the operating position along the line of intersection AA according to FIG. 1.
Figure 5:
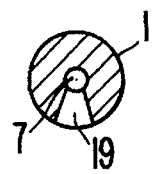
FIG. 5 is a cross-section of the cock along the line of intersection CC according to FIG. 4 in starting position, in which the melt is deflected downward by 90°.

Depending on the desired throughput or depending on the die plate diameter, therefore, the number of dies may also vary and can be adapted to the respective circumstances. Preferred is a number of dies from 50 to 500, but the number of dies can, as already mentioned, be both increased and decreased according to the given requirements. The die diameter d (FIG. 3) is in this case preferably 1 to 5 mm.

The heating of the die plates may take place, for example, by means of steam, hot oil or current. It is in this case advantageous to obtain identical conditions at the two die plates 3 and 3' with respect to the amount passing through and consequently to obtain identical pellets. This can be achieved, for example, by the die plates 3 and 3' being heated by means of separate heating circuits and by the amount passing through being regulated by means of the die plate temperature, determined by suitable temperature checks. Examples of a suitable cooling medium are water, nitrogen or air. Water is used with preference as the cooling medium. To be able for example in the case of underwater pelletizing to keep a closer check on the respective amount of water and also to permit methods of operation with different cooling water temperatures, separate cooling water circuits or cooling water supplies can be used in the case of the process according to the invention.

The die plates 3 and 3' are respectively assigned a cutting device 8, comprising drive unit 9 and cutting knife head 10.

The melt flow takes place in the apparatus according to the invention by the process according to the invention from the extrusion device, the extruder 11, via the bore 16 through the inlet opening 18 into the cock 1. The melt then passes from the bores or the outlets 5 and 5' into the manifold spaces 2 and 2', respectively. From here, the melt passes directly to the die plates 3 and 3' and, when it emerges, is cut into pellets. It is, however, also possible to divide the melt into more than two part-streams and feed it to the same number of die plates as there are part-streams. The upper limit of the possible part-streams is in this case constrained by factors relating to the construction of the machine.

The process according to the invention and the apparatus according to the invention are suitable in particular for pelletizing thermoplastics, for example polypropylene, having a melt flow index of from 50 to 500.

The process according to the invention and the apparatus according to the invention make it possible to obtain high throughputs without the disadvantages arising in the case of pelletizing techniques previously known for high throughputs. According to the invention, consequently the complex requirements during the pelletizing operation are met in an advantageous way. For instance, a particular achievement is that large amounts of product can be pelletized by means of small components.

If, for example, polymers having a melt flow index of greater than 50 are pelletized, the throughput may be up to 6 t/h; in the pelletizing of polymers of lower melt flow index, however, higher throughputs, for example of up to 20 t/h, but also more, are also possible.

What we claim is:

1. An apparatus for pelletizing polymer melts in order to obtain short melt flow paths and uniform pellet size, wherein a starting valve (13) is arranged in a housing (4) of a pelletizing device, which housing is connected to an outlet end of an extrusion device (11), and the starting valve (13) comprises a cock (1) which can be changed in its position in the housing (4), the cock (1) having, in the operating position, an inlet opening (18), connected to the extrusion device (11), and laterally of said opening, at least two outlets (5) connected thereto, to which outlets there are respectively connected, in the housing, manifold spaces (2) which are substantially free from dead spots and connect the cock (1) to at least two die plates (3), which die plates are heatable and spatially separate from one another.

2. The apparatus as claimed in claim 1, wherein said cock (1) has two outlets (5 and 5'), to which there are respectively connected manifold spaced (2 and 2') which are virtually free from dead spots and connect said cock to two die plates (3 and 3') which are spatially separate and heatable.

3. The apparatus as claimed in claim 1, wherein the apparatus is connected to two separate supplies of cooling medium.

4. The apparatus as claimed in claim 1, wherein the die plates have from 50 to 500 dies and a die diameter of from 1 to 5 mm.

* * * * *